United States Patent [19]

Ferziger et al.

[11] Patent Number: 4,526,830

[45] Date of Patent: Jul. 2, 1985

[54] COATED FABRIC AND MATTRESS TICKING

[75] Inventors: Daniel Ferziger, 4515 Greystone Ave., Riverdale, N.Y. 10471; Jerry Lippman, North Bergen, N.J.

[73] Assignee: Daniel Ferziger, Riverdale, N.Y.

[21] Appl. No.: 171,327

[22] Filed: Jul. 23, 1980

[51] Int. Cl.$^3$ .............................................. B32B 7/00
[52] U.S. Cl. ......................................... 428/268; 5/459; 5/483; 428/442; 428/913; 428/920
[58] Field of Search ............. 428/240, 242, 246, 251, 428/263, 268, 273, 285, 286, 290, 920, 921, 429, 441, 442, 266, 913, 341; 427/407.3; 524/178, 179; 5/459, 483; 297/DIG. 5

[56] References Cited

U.S. PATENT DOCUMENTS

| | | |
|---|---|---|
| Re. 24,591 | 1/1959 | Schwartz . |
| 2,272,397 | 2/1942 | Becher et al. ........................ 260/768 |
| 2,381,542 | 8/1945 | Hyatt et al. . |
| 2,428,591 | 10/1947 | Slayter . |
| 2,455,802 | 12/1948 | Pfeffer ................................ 117/126 |
| 2,537,652 | 1/1951 | Churchill . |
| 2,632,187 | 3/1953 | Wooffendale . |
| 2,720,269 | 10/1955 | Diacos . |
| 2,726,977 | 12/1955 | See et al. . |
| 2,801,427 | 8/1957 | Crocker . |
| 2,919,200 | 12/1959 | Dubin et al. ......................... 106/15 |
| 2,956,917 | 10/1960 | Fasano ................................ 154/128 |
| 3,279,986 | 10/1966 | Hyman . |
| 3,308,488 | 3/1967 | Schoonman . |
| 3,436,771 | 4/1969 | Fisher . |
| 3,490,985 | 1/1970 | Marzocchi et al. ................. 428/268 |
| 3,666,522 | 5/1972 | George ................................ 117/33 |
| 3,668,041 | 6/1972 | Lonning ............................. 156/309 |
| 3,691,570 | 9/1972 | Gaines et al. ........................ 5/161 |
| 3,709,721 | 1/1973 | King ................................... 117/104 R |
| 3,723,139 | 3/1973 | Larkin et al. ................... 260/45.75 R |
| 3,862,291 | 1/1975 | Brandon, Jr. et al. .............. 264/321 |
| 3,864,156 | 2/1975 | Weil ................................... 117/136 |
| 3,864,468 | 2/1975 | Hyman et al. ........................ 424/16 |
| 3,883,463 | 5/1975 | Jin et al. .............................. 260/29.4 |
| 3,934,066 | 1/1976 | Murch ................................ 428/248 |
| 3,968,284 | 7/1976 | George ................................ 428/90 |
| 3,968,297 | 7/1976 | Sauer ................................... 428/268 |
| 4,097,630 | 6/1978 | Schwartz et al. ..................... 428/97 |
| 4,174,418 | 11/1979 | Welch et al. ......................... 428/264 |
| 4,204,018 | 5/1980 | Bernstein et al. ................... 428/291 |
| 4,254,177 | 3/1981 | Fulmer ............................... 428/256 |
| 4,265,962 | 5/1981 | May ................................... 428/267 |

FOREIGN PATENT DOCUMENTS

| | | |
|---|---|---|
| 207566 | 10/1976 | Argentina . |
| 476279 | 8/1951 | Canada . |
| 1563211 | 3/1969 | France . |
| 867746 | 5/1961 | United Kingdom ............... 428/251 |

OTHER PUBLICATIONS

Encyclopedia of Chem. Technology, pp. 472–473, 25 and 407.
H. S. Katz. The Handbook of Fillers and Reinforcements for Plastics, 1978, p. 237.
*Contract*, Specifier Must Assess Fabric Flammability Muddle in Terms of Client Needs (Dec. 1973).
*American Textiles Reporter/Bulletin*, New-Flameproof, Nontoxic Home Furnishings (Sep. 1973).
Fibercoat; The New Miracle Fabric.
Fibercoat Fire Resistant Wall-Fabrics (a colorscope sample).

*Primary Examiner*—James J. Bell

[57] ABSTRACT

This invention relates to coated fiberglass fabrics especially suitable for use as mattress tickings. The fabrics comprise a woven or non-woven fiberglass fabric to which a layer of a polymeric coating composition has been applied. The coating comprises a polymeric carrier containing an effective amount of a fungicide and/or bacteriocide, an effective amount of a flame retardant, and a filler which also functions to enhance the flame retardant properties of the fabric.

42 Claims, No Drawings

COATED FABRIC AND MATTRESS TICKING

FIELD OF THE INVENTION

This invention relates to coated fiberglass fabrics which are bacteriostatic, impermeable to liquids such as urine, resistant to chemical attack, and, in addition, are flame retardant. The coated fiberglass fabrics of the present invention are also durable and easy to care for.

BACKGROUND OF THE INVENTION

Flame retardant fabrics are desirable for use in the manufacture of furniture upholstery, curtains, mattress tickings, bedspreads and the like for domestic use as well as for use in institutions, hotels or other commercial establishments, where the safety element associated with such fabrics is desirable. In some states the use of flame retardant bedding upholstery in institutions such as hospitals, nursing homes, mental institutions, prisons, universities and the like, is required by law.

Flame retardance has been achieved in heavy cotton fabrics such as A.C.A. striped mattress ticking, by treating the cotton fabric with a hydrated sodium borate compound. The sodium borate treatment functions both to reduce the rate of travel of the flame through the fabric, as well as to contribute a self-extinguishing property to the fabric, such that upon removal of the external flame source, the treated fabric itself is substantially incapable of supporting a flame.

In addition to the property of flame retardance, for many applications it is desirable that a fabric be bacteriostatic and/or fungistatic as well as water resistant. Treated fabrics having these combined properties would be extremely well suited for use in the manufacture of mattress tickings for use in institutions such as hospitals or prisons. Of course, a fabric employed as a mattress ticking for institutional use must also be resistant to the extreme wear associated with institutional usage. The A.C.A. striped ticking mentioned above has acceptable wear resistance properties. However, the chemical resistance of this fabric is poor and, therefore, its flame retardance deteriorates as a result of exposure to conventional cleaning processes.

U.S. Pat. No. 3,279,986 discloses a coated fabric which has acceptable wear properties, is flame retardant, and is also resistant to chemical attack. The fabric disclosed by this reference comprises a nylon scrim coated or laminated on both sides with a flexible sheet of polyvinyl chloride which incorporates about 0.10 to 0.60% of a bis-(tri-n-alkyltin) sulfosalisylate bacteriocidal compound. However, due to the relatively large amount of polyvinyl chloride employed by the polymeric vinyl layers of this product, when exposed to a direct flame the vinyl layer chars and releases relatively large amounts of toxic fumes.

Fiberglass fabrics and wools have been employed in the manufacture of fireproof mattress pads. See, U.S. Pat. Nos. 2,632,187 and 2,801,427.

U.S. Pat. No. 2,801,427 (hereinafter '427) discloses a fireproof bed pad or mattress cover comprised of an inner layer of aluminum foil sandwiched between two insulating layers formed from a mineral wool of fiberglass. The outermost surface layer of the mattress pad described by this reference is comprised of a waterproof cloth.

U.S. Pat. No. 2,632,187 (hereinafter '187) discloses a fire resistant and water repellant mattress pad comprised of a thick inner fiberglass batting layer contained between a facing or upper layer of fiberglass cloth, and a backing layer of cotton fabric.

Although the fiberglass layers of the mattress pads disclosed by the '427 and '187 patents are flame retardant and flame resistant, the outer cloth layers of the mattress pads disclosed by these references provide a potential source of flammable material which could be hazardous in the event of fire.

Woven or matted fiberglass coated with lacquer coating compositions have also been employed in the manufacture of window shades which are resistant to deterioration by sunlight, water, heat and cold. See U.S. Pat. No. 2,381,542 (hereinafter '542). The fiberglass coatings disclosed by the '542 patent are prepared from cellulose derivative fiber formers and do not include fire retardants, fungicides or bacteriocides.

In addition to fiberglass coated window shades, it is also known to coat thin fiberglass sheets with polyester. The coated fiberglass sheets are bonded as a laminate to printed circuit sheets formed from copper.

It is also known to coat burlap fabrics suitable for use as wall coverings with flame retardant coating compositions. In particular, burlap fabrics have been coated with a fire retardant plasticized polyvinyl chloride based coating composition containing antimony pentaoxide.

Although the prior art discloses coated fabrics, the prior art does not provide a chemically coated fiberglass fabric which is flame retardant, fungistatic, bacteriostatic, impermeable to liquids such as water or urine, resistant to chemical attack, and which does not release dangerous amounts of toxic fumes when it burns.

Accordingly, it is an object of the present invention to provide a coated fiberglass fabric which possesses each of the properties listed above.

It is also an object of the present invention to provide a fiberglass based mattress ticking or cover possessing each of the properties listed above, and which is particularly well suited for use on mattresses employed in institutions such as hospitals or prisons or for commercial use in hotels, or in other settings where extreme usage conditions prevail.

BRIEF DESCRIPTION OF THE INVENTION

In accordance with the foregoing objectives, the present invention provides a coated flame retardant, water impermeable, bacteriocidal and fungicidal, hypoallergenic, non-abrasive and chemically resistant mattress ticking comprised of a woven or non-woven fiberglass fabric, a first layer of a polymer based coating composition, said coating composition comprising a polymeric carrier selected from the group consisting of polyvinyl chloride, polytetrafluoroethylene, neoprene, polyvinyl chloride acetate copolymer, ethylene vinylidine chloride, acrylic vinyl chloride latex, vinyl chloride acrylic polymers, chlorosulfonated polyethers, acrylic homopolymers or copolymers, and silicone rubbers; and said polymeric carrier containing an effective amount of a flame retardant and a fungicide and bacteriocide; wherein the amount of said coating composition comprising said first coating layer is adapted to render said fiberglass fabric substantially impermeable to liquids and resistant to bacteria and fungi; and a second surface coating layer on said first coating layer, said second coating layer comprising a polymeric carrier containing an effective amount of a fungicide and bacteriocide, wherein said surface coating layer is adapted to provide a non-abrasive, bacteriocidal and fungicidal surface on said mattress ticking.

The present invention also provides a coated fabric which is suitable for use in the manufacture of furniture upholstery, drapery, mattress pads, mattress covers, mattress ticking and the like comprising a woven or non-woven fiberglass fabric, a coating layer of a polymer based coating composition; said coating composition comprising a plasticizer, an effective amount of a flame retardant, and an effective amount of fungicide and bacteriocide, wherein the amount of said coating composition comprising said coating layer is adapted to render said fiberglass fabric impermeable to liquids and resistant to bacteria and fungi.

DETAILED DESCRIPTION OF THE INVENTION

The chemically coated fabric of this invention comprises a woven or non-woven fiberglass fabric base to which one or more thin layers of a polymeric coating have been applied. The fiberglass fabric base is inherently fire retardant. In addition, the coating is fire retardant, and renders the fiberglass fabric base impermeable to liquids such as urine, as well as bacteriostatic and/or fungistatic. The coating layer is also chemically resistant and, hence, the coating does not deteriorate as a result of exposure to conventional cleaning processes.

The fabric base may comprise any conventional woven or non-woven fiberglass fabric. However, the particular fiberglass fabric selected will depend upon the end-use intended for the coated fiberglass fabric product. For example, for the preparation of the mattress ticking of this invention, a fiberglass fabric having a tensile strength in the range of from about 150 lbs./sq. inch to about 292 lbs./sq. inch is employed. Preferably, the woven or non-woven glass fabric employed to prepare the mattress ticking of this invention has a tensile strength of about 250 lbs./sq. inch. Fiberglass fabrics having tensile strengths in the ranges indicated exhibit the degree of elasticity and resistance to tear considered desirable for commercial mattress tickings.

A particularly suitable fiberglass fabric for use in the manufacture of mattress tickings is a fiberglass fabric which is woven in a Jacquard weave. It has been found that the Jacquard weave functions to enhance the strength of fiberglass fabrics. The fiberglass yarn from which the Jacquard fabric may be woven is a single ply C-fiber yarn which is one turn out-of-twist and has a Denier of 75. During the weaving process one 42 inch warp is wound around four beams of $2 \times 523$ and $2 \times 524$ ends, and a 12-harness weave is employed to provide the Jacquard pattern. The fabric has a weight of about 8.71 ounces per yard, and about 1.56 yards per pound. Fiberglass fabrics of this type are commercially available from the Clark-Schwebel Fiber Glass Corporation of White Plains, New York under the style designation number 487/2/42.

The coating layer which is applied to the fabric base comprises a polymeric carrier which contains one or more component ingredients which contribute to the flame retardance of the coating, such as antimony pentaoxide and/or antimony trioxide. The coating formulation may also contain an effective amount of a plasticizer, and a filler as well as one or more bacteriostatic and/or fungistatic agents. Preferably, the filler also functions as a flame retardant.

Suitable polymeric carriers include chlorine containing polymers such as polyvinyl chloride, polyvinyl chloride acetate copolymer, acrylic vinyl chloride latex or ethylene vinylidine chloride polymers. Suitable ethylene vinylidene chloride polymeric carriers are commercially available from the Air Products Corp. under the tradename Air Flex 45-14. Alternatively, the polymeric carrier may be polychloroprene (i.e. neoprene); chlorosulfonated polyethers such as Hypalon ® which is commercially available from Dow Chemical Co., or silicone rubber. The polymeric carrier may also be comprised of a vinyl chloride acrylic copolymer or an acrylic homopolymer or copolymer, or polytetrafluoroethylene. However, the preferred polymeric carrier is an acrylic vinyl chloride latex which is comprised of a carboxylated copolymer of vinyl chloride and a softer acrylate which self cross-links upon curing. Polymers of this type are commercially available from the B. F. Goodrich Co. of Akron, Ohio under the chemical product designation No. 460X2.

Any conventional plasticizer which is compatible with the other components of the coating formulation may be employed. For example, suitable plasticizers include the phosphate plasticizers such as para-tricresyl phosphate or octyldiphenyl phosphate. Para-tricresyl phosphate is a colorless liquid which in addition to functioning as a plasticizer also contributes to the water impermeability and flame retardance of the coating.

The plasticizer may also be comprised of a chlorinated or brominated paraffin compound which in addition to improving the "hand" of the coating, functions to aid in the flame retardant properties of the polymeric carrier. Preferred plasticizers of this type are the chlorinated paraffins having about a 50% chlorine content.

The coating formulation may also include an ingredient such as aluminum trihydrate which contributes to the flame retardance of the coating. When exposed to heat, aluminum trihydrate releases water vapor and, hence, functions as a flame retardant.

The primary fire retardant component employed in the coating is antimony trioxide and/or antimony pentaoxide. These compounds impart fire retardant properties to the coating when employed in combination with the chlorine or bromine containing compounds of the coating formulation, in the proportions described.

The antibacterial and/or antifungal properties of the coating are provided by including a bacteriostatic and/or fungistatic agent in the coating formulation. Any conventional bacteriocide and/or fungicide which is compatible with the polymeric carrier and the other components of the formulation may be employed, e.g. bis(tri-n-alkyltin) sulfosalisylates disclosed in U.S. Pat. No. 3,279,986. However, the preferred bacteriocide and fungicide is N-trichloromethylthio-4-cyclohexene-1,2-dicarboximide. The bacteriocidal and fungicidal properties of N-trichloromethylthio-4-cyclohexene-1,2-dicarboximide may also function to prevent the stiffening of the coating due to plasticizer depletion caused by the activity of bacteria and fungi. This compound is commercially available from R. T. Vanderbuilt, Inc., 20 Winfield Street, Norwalk, Connecticut, and is marketed under the tradename Vancide ®89.

In order to function effectivley as a fungicide and in particular to prevent unsightly mildew and bacterial growth, the fungicidal and/or bacteriocidal component must migrate to the surface of the coating layer. The rate of migration of the fungicidal and/or bacteriocidal component is determined by the compatibility of the component in the coating formulation. If this component does not migrate at a proper rate, an effective concentration of the active ingredient will not be present at the surface of the coating layer. On the other hand, if the migration of the fungicide and/or bacteriocide is too rapid, unsightly blooming of the component on the surface of the coating layer will occur. In accordance with the coating formulation of this invention from about 0.5 to 2 parts, and preferably about 1 part of a fungicide and bacteriocide (based on 100 parts of the polymeric carrier) such as N-trichloromethylthio-4-cyclohexene-1,2-dicarboximide is employed. At this concentration level the fungicide and bacteriocide are compatible with the other components of the formulation, and a concentration of the ingredient on the surface of the coating which is effective against fungi and bacteria is provided.

Preferably the coating formulation contains, based on 100 parts of the polymeric carrier, from about 25 to 75 parts of the filler (e.g. aluminum trihydrate), from about 5 to 25 parts of the plasticizer, from about 3 to 10 parts of antimony trioxide or antimony pentaoxide, and from about 0.5 to 2 parts of the bacteriocidal and/or fungicidal agent. Preferably, the polymeric carrier is an acrylic vinylchloride latex, the filler is aluminum trihydrate, the plasticizer is a chlorinated paraffin having about a 50% chlorine content, and the bacteriocide and fungicide is N-trichloromethylthio-4-cyclohexene-1,2-dicarboximide. For example, the coating formulation may comprise on a dry-weight basis about 140 parts acrylic vinyl chlorine latex, about 56 parts aluminum trihydrate, about 6 parts antimony pentaoxide, about 30 parts of a chlorinated paraffin (50% chlorine) and about 1.7 parts of N-trichloromethylthio-4-cyclohexene-1,2-dicarboximide.

The coating formulation is prepared by first mixing together the polymeric carrier, antimony pentaoxide and aluminum trihydrate in the form of about 50% dispersions of each of the components in water. Although aqueous solvent systems are preferred since they do not present the environmental hazards associated with more volatile solvent systems, other compatible solvents systems may be employed. Moreover, plastisols of polyvinyl chloride or vinyl chloride acetate may be employed.

Preferably, before being dispersed in water, the aluminum trihydrate is ground in a mill until the average particle size of the aluminum trihydrate is less than about 10 microns. The aluminum trihydrate is then dispersed in water in the presence of about 1% by weight (based on the dry weight of the aluminum trihydrate) of a dispersing agent. Suitable dispersing agents include the nonionic dispersing agents, or trisodium phosphate or any other compatible dispersing agent.

The plasticizer and bacteriocide and/or fungicide are then added to the aqueous dispersion of the polymeric carrier, fire retardant and aluminum trihydrate. Prior to coating the formulation onto the fabric base, the viscosity of the formulation is adjusted through the addition of a suitable thickener. The viscosity to which the formulation is adjusted will be determined by the particular coating method employed. Suitable thickeners include methylcellulose, high molecular weight acrylic acids, or preferably a nonionic thickener such as Carbopol® which is commercially available from the Union Carbide Corporation.

After the viscosity of the formulation has been adjusted, the pH of the formulation is adjusted to below about 7.0, and preferably within the range of from about 5.5 to 6.5 with acid or base as required. Preferably the acid employed for pH adjustment is acetic acid and the preferred base is ammonia.

Any conventional coating process may be employed to apply the coating formulation onto the fabric base. For example, a floating knife process, a knife over-roll process, or a reverse-roll coating process may be employed. For use in a floating knife coating process, the viscosity of the formulation should be adjusted through the addition of a thickener to from about 4,000 to 16,000 centipoises, and preferably about 16,000 centipoises. When a knife over-roll coating process is employed, the viscosity of the formulation is preferably adjusted to from about 50,000 to 60,000 centipoises. For use in a reverse-roll coating process the viscosity of the formulation is preferably adjusted to from about 4,000 to 5,000 centipoises. The preferred coating process for use in applying the coating formulation to the fiberglass fabric base is the floating knife process, wherein the viscosity of the coating formulation is adjusted to about 16,000 centipoises through the addition of about 1.6 parts of the thickener (on a dry weight basis) to the coating formulation.

Upon application to the fabric base, the coatings are cured by passing the coated fabric through an oven at a temperature of about 325° F.

The coating may be applied to one or both sides of the fiberglass fabric base. The weight of the coating applied should not exceed about 6 ounces per square yard of fabric, nor be less than about 1 ounce per square yard. Preferably the weight of coating layer applied is about 2 to about 3 ounces per square yard of the fabric base.

The coating layer adheres well to the fiberglass fabric base and does not require auxiliary adhesion promoters. However, adhesion promoters may be included in the coating formulation, and their use may be desired where particularly adhesion resistant fiberglass fabrics are utilized. Useful adhesion promoters include N-(β-aminoethyl-α-aminopropyl)trimethoxy silane. Adhesion propoters of this type are commercially available from the Union Carbide Corp. under the product designation A1120.

When the polymeric carrier of the coating composition is a latex type carrier, such as the acrylic vinyl chloride latex carrier discussed above, the surface texture of the cured fabric coating may be tacky or sticky. The surface of the cured fabric coating is finished by applying additional coating layers of a polymeric material to the cured coating layer. The outer coating layer provides a smooth, and abrasion resistant surface on the fabric surface. For example, a thin finishing layer of a vinyl chloride acrylic compound may be applied to the fabric by any of the coating processes discussed above. In order to insure the presence of an effective amount of the fungicide and/or bacteriocide on the surface of the fabric coating, an effective amount of a fungicide and/or bacteriocide may also be included in the composition employed as the surface coating layer. For example, about 1 part by weight of N-trichloromethyl-4-cyclohexene-1,2-dicarboximide may be included in the formulation employed as the surface coating layer.

The surface coating layer is preferably employed in an amount of from about 0.1 to about 0.5 ounces per square yard of fabric. However, the amount of material coated onto the first cured coating layer will depend to a great extent upon the particular coating material employed, and the surface textures desired. Preferably, however, the coating material employed is a vinyl chloride acrylic polymer which is coated onto the first fabric coating layer in an amount of about 0.25 ounces per square yard. Moreover, the total weight of the first and second coating layers preferably should not exceed about 6 ounces per square yard of the fabric base. Vinyl chloride acrylic compounds suitable for use as the surface coating layer are commercially available from the B.F. Goodrich Company, under the chemical product designation number 460X1.

The invention will be described further with reference to the following detailed Examples

EXAMPLE 1

A coating formulation was prepared containing on a dry weight basis:

|  | Parts |
| --- | --- |
| Acrylic Vinyl Chloride Latex (460X2 - B. F. Goodrich Co.) | 140 |
| Aluminum Trihydrate | 56 |
| Antimony pentaoxide | 6 |
| Chlorinated Paraffin Plasticizer (50% Chlorine) | 30 |
| Vancide 89 (N—trichloromethylthio-4-cyclohexene-1,2-dicarboximide) | 1.7 |

The formulation is prepared by mixing together a 50% aqueous dispersion of the acrylic vinyl chloride latex and a 50% aqueous dispersion of the antimony oxide. Prior to adding the aluminum trihydrate, the compound is ground in a mill until the average particle size is about 5 microns. A 50% aqueous dispersion of the milled aluminum trihydrate is prepared by dispersing the compound in water in the presence of about 1% by weight of trisodium phosphate. The aqueous dispersion of the aluminum trihydrate is then added to the aqueous dispersion of the polymer and the antimony oxide. Thirty parts of a chlorinated paraffin (60% chlorine content) plasticizer, and 1.7 parts of N-trichloromethylthio-4-cyclohexene-1,2-dicarboximide are then added to the aqueous dispersion of the other ingredients, and the formulation is mixed in a high speed mixer until uniform.

The viscosity of the formulation is adjusted to about 16,000 centipoises through the addition of about 1.6 parts by weight of Carbopol ®. The pH of the formulation is then adjusted to preferably within the range of from about 5 to 6.5 through the addition of acetic acid.

The coating formulation is applied to a fiberglass fabric base by a floating knife coating process. The fabric base is a Clark-Schwebel Fiber Glass Corp. (Style No. 487/2/42) fiberglass fabric which is woven in a Jacquard weave. The fabric is woven from a C-fiber which is one turn out-of-twist and has a Denier of about 75. The coating layer is applied to both sides of the fabric in one or several passes in a weight of about 3 ounces per square yard of fabric, and the coating is cured by passing it through an oven at a temperature of about 325° F.

A surface coating formulation is prepared by adding 1.7 parts of N-trichloromethylthio-4-cyclohexene-1,2-dicarboximide to a 50% aqueous dispersion of 140 parts of a vinyl chloride acrylic polymer (B.F. Goodrich 460X1). The mixture is then thoroughly blended, and the viscosity is adjusted to about 16,000 centipoises through the addition of Carbopole ®. The pH is adjusted with acid to about 6.5.

The surface coating formulation is applied to the cured coated fabric described above. About 0.25 ounces of the surface coating is applied per yard of fabric treated. The coating is cured by passing it through an oven at about 325° F.

The coated fiberglass fabric has a non-abrasive and abrasion resistant surface. Moreover, the coated fabric prepared in accordance with this example is flame retardant, and is also resistant to conventional chemical cleaning agents. Due to the inclusion of an effective amount of a bacteriocide and fungicide in the coating layers, the fabric product will not support fungi growth and is resistant to both gram negative and gram positive bacteria. Thus, the fabric if free of the odors associated with the presence of bacteria or fungi. Moreover, the coating layers render the fabric entirely impermeable to liquids.

EXAMPLE 2

A mattress is prepared from the coated fabric product of Example 1, by sewing the fabric about a conventional mattress unit. For example, the mattress unit may comprise a box spring mattress unit, an inner spring unit, or foam rubber.

The mattress employing the mattress ticking of this invention has a smooth, non-abrasive surface, not generally associated with fiberglass fabrics. The coated fiberglass ticking is also hypo-allergenic. The durability and other properties which inhere in the coated fabric of this invention render mattress tickings, and mattresses employing them ideally suited for use in institutions or in other settings where extreme usage conditions prevail.

In order to evaluate its flame retardant property, a mattress employing the mattress ticking of Example 1 was wrapped around an inner core of newspapers and drenched in gasoline. The newspapers were ignited in order to evaluate the flame retardant property of the mattress. After the fire was naturally exhausted due to consumption of the newspaper filler, the mattress was unwrapped, and the surface of the mattress ticking was examined. The mattress ticking was entirely free of char, and only a very slight discoloration was noted on the ticking surface.

While specific embodiments of the coated fiberglass fabric of this invention have been described with particularity herein, it should be understood that this invention is intended to cover all changes and modifications of the embodiments of the invention chosen herein for purposes of illustration, which do not constitute departures from the spirit and scope of the present invention.

I claim:

1. A drapable fabric article such as a mattress ticking or cover, bedspread, upholstery, drapery or the like, prepared by sewing together portions of a sewable and flame retardant fiberglass fabric, said fabric comprising a single base layer of a tightly woven fiberglass fabric having on at least one surface thereof an unfoamed coating of a flame retardant and plasticized polymeric coating composition, said coating having been formed by applying up to about 3 ounces per square yard of said coating composition directly to and over the entirety of at least one surface of the fiberglass fabric base, wherein said coating is the outermost surface layer of the finished fabric, and is present in an amount sufficient to make said fiberglass fabric base non-abrasive and abrasion resistant, and the coated fabric sewable and drapable, and wherein said fabric article includes a seam formed by sewing together portions of said coated fabric.

2. The fabric article according to claim 1 wherein the fabric article comprises a mattress ticking or cover which is sewn about an inner mattress unit.

3. The fabric article according to claim 1 wherein the amount of said coating composition applied to said fabric is adapted such that after application of said coating the weave pattern of said tightly woven fiberglass is tactilely and visually apparent.

4. The fabric article according to claim 1 wherein said coating comprises at least one layer of a polymer based coating composition comprised on a dry-weight basis of about 100 parts of a chlorinated polymer, and about 3 to 10 parts of a flame retardant.

5. The fabric article according to claim 4 wherein said polymer is selected from the group consisting of polyvinyl chloride, polyvinyl chloride acetate copolymers, ethylene vinylidene chloride and acrylic vinyl chloride latex.

6. The fabric article according to claim 4 wherein based on 100 parts of the polymer said coating composition includes about 5 to about 25 parts of a plasticizer, and about 25 to about 75 parts of a filler and about 3 to about 10 parts of a flame retardant component, on a dry-weight basis.

7. The fabric article according to claim 6 wherein said polymer is an acrylic vinyl chloride latex, said filler is aluminum trihydrate, said flame retardant is antimony trioxide or antimony pentaoxide, and said plasticizer is a chlorinated paraffin plasticizer having about a 50% chlorine content.

8. The fabric article according to claim 1 wherein said fiberglass fabric base is woven from a single ply C-fiber fiberglass yarn.

9. The fabric article according to claim 4 or claim 6 wherein the amount of the coating composition comprising said coating is adapted to render said fabric impermeable to liquids, and said polymer is acrylic vinyl chloride latex.

10. The fabric article according to claim 1 wherein said coating is comprised of an innermost coating layer and an outermost coating layer wherein the innermost coating layer is comprised of acrylic vinyl chloride latex, and the outermost coating layer is comprised of acrylic vinyl chloride polymer, and the outermost cured surface of said coated fabric is non-abrasive and abrasion resistant.

11. The fabric article according to claim 10 wherein said innermost coating layer comprises about 0.1 to 0.5 ounces per square yard of said fabric, and wherein the combined weight of said innermost and outermost coating layers comprises from about 1 to about 4 ounces per square yard of said fabric.

12. The fabric article according to claim 4 wherein said coating composition comprises on a dry-weight basis about 140 parts of an acrylic vinyl chloride latex, about 56 parts of aluminum trihydrate, about 30 parts of a plasticizer, and about 6 parts of antimony pentaoxide, and said fiberglass fabric base is woven from a single ply C-fiber fiberglass yarn.

13. The fabric article according to claim 1 comprising an effective amount of a fungicide and/or bacteriocide in said coating composition.

14. The fabric article according to claim 5 or claim 6 further including in said coating composition about 0.5 to 2 parts by weight of a fungicide and/or bacteriocide.

15. The fabric article according to claim 10 wherein said outermost coating layer includes an effective amount of a fungicide and/or bacteriocide and said outermost coating layer is adapted to provide said non-abrasive and abrasion resistant fabric with a surface resistant to fungi and/or bacteria.

16. The fabric article according to claim 14 wherein said bacteriocide and fungicide is N-trichloromethylthio-4-cyclohexane-1,2-dicarboximide.

17. The fabric article according to claim 1 which comprises a mattress ticking or cover.

18. The fabric article according to claim 5, 6, 7, 8, 10 or 11 which comprises a mattress ticking or cover.

19. The fabric article according to claim 9 which comprises a mattress ticking or cover.

20. The fabric article according to claim 13 which comprises a mattress ticking or cover.

21. The fabric article according to claim 3 which comprises a mattress ticking or cover.

22. The fabric article according to claim 1 which comprises furniture upholstery.

23. The fabric article according to claim 5, 6, 7, 8, 10 or 11 which comprises furniture upholstery.

24. The fabric article according to claim 9 which comprises furniture upholstery.

25. The fabric article according to claim 13 which comprises furniture upholstery.

26. The fabric article according to claim 3 which comprises furniture upholstery.

27. The fabric article according to claim 1 which comprises drapery.

28. The fabric article according to claim 5, 6, 7, 8, 10 or 11 which comprises drapery.

29. The fabric article according to claim 9 which comprises drapery.

30. The fabric article according to claim 13 which comprises drapery.

31. The fabric article according to claim 3 which comprises drapery.

32. The fabric article according to claim 1 which comprises a bedspread.

33. The fabric article according to claims 5, 6, 7, 8, 10 or 11 which comprises a bedspread.

34. The fabric article according to claim 9 which comprises a bedspread.

35. The fabric article according to claim 13 which comprises a bedspread.

36. The fabric article according to claim 3 which comprises a bedspread.

37. A mattress comprising an inner mattress unit and an outer mattress wherein the ticking comprises the fabric article of claim 1.

38. A mattress comprising an inner mattress unit and an outer mattress ticking wherein the ticking comprises the fabric article of claims 5, 6, 7, 8, 10 or 11.

39. A mattress comprising an inner mattress unit and an outer mattress ticking wherein the ticking comprises the fabric article of claim 9.

40. A mattress comprising an inner mattress unit and an outer mattress ticking wherein the ticking comprises the fabric article of claim 13.

41. A mattress comprising an inner mattress unit and an outer mattress ticking wherein the ticking comprises the fabric article of claim 3.

42. The drapable fabric article according to claim 1 wherein at least one surface of said fabric base comprises about 0.5 ounces per square yard of said coating composition.

* * * * *